United States Patent [19]

Akutagawa

[11] Patent Number: 5,263,844
[45] Date of Patent: Nov. 23, 1993

[54] ELASTIC MOLD
[75] Inventor: Tokuji Akutagawa, Tokyo, Japan
[73] Assignee: Akutagawa Confectionery Co., Ltd., Tokyo, Japan
[21] Appl. No.: 849,950
[22] Filed: Mar. 12, 1992
[30] Foreign Application Priority Data Mar. 14, 1991 [JP] Japan .............................. 3-014857[U]
May 28, 1991 [JP] Japan .................................. 3-123542

[51] Int. Cl.⁵ .............................................. B29C 33/50
[52] U.S. Cl. .................................... 425/437; 425/438; 425/440; 425/DIG. 44; 264/313; 264/314; 249/117; 249/127
[58] Field of Search .................... 425/438, 436 R, 437, 425/436 RM, DIG. 44, 439, 275, 440, DIG. 54; 249/66.1, 117, 127; 264/313, 314; 426/512, 516

[56] References Cited

U.S. PATENT DOCUMENTS

| Re. 20,460 | 8/1937 | Jeffery | 264/314 |
|---|---|---|---|
| 2,124,871 | 7/1938 | Beal | 425/440 |
| 3,872,195 | 3/1975 | Stegmeier | 264/313 |
| 4,022,862 | 5/1977 | McBride et al. | 264/313 |
| 4,123,494 | 10/1978 | Eurard et al. | 264/313 |
| 4,144,411 | 8/1978 | Pooler | 426/421 |
| 4,802,839 | 2/1989 | Hidawa | 425/439 |
| 4,854,843 | 8/1989 | Takeda et al. | 425/DIG. 44 |
| 5,154,937 | 10/1992 | Fujishima | 425/440 |

FOREIGN PATENT DOCUMENTS 63-31726  2/1988  Japan .

Primary Examiner—Khanh P. Nguyen
Attorney, Agent, or Firm—Charles E. Baxley

[57] ABSTRACT

An elastic mold consists of a product molding section in which a fluidized charging material is charged and solidified to form a molded product, and a mold holding section formed integrally with a take-out opening which is contiguous to the product molding section and which is smaller in size than the molded product. The take-out opening contiguous to the product molding section and the mold holding section is of uniform thickness and is curved smoothly.

2 Claims, 4 Drawing Sheets

ELASTIC MOLD

BACKGROUND OF THE INVENTION

This invention relates to an elastic mold used for producing a molded product by charging a fluidized molding material therein and extracting a solidified molded product therefrom and a method for producing a molded product using the elastic mold.

It has been known to use an elastic mold of rubber or synthetic resin for mass-producing molded products having three-dimensional portions on their surfaces such as chocolate cakes or ice creams from a fluidized molding or charging material. Such elastic mold is composed of a product molding section for duplicating a molded product and a holding section for securing the mold to a production device. The fluidized charging or molding material is charged into the mold and solidified to form a molded product, and the elastic mold is then expanded to extract the molded product from the mold.

A typical production device for producing such charged molded product using such elastic mold is disclosed in, for example, Japanese Laid-open Patent Application No. 63-31726 (1988). The production device is composed of a unit for charging a molding material into an elastic mold in the shape of a pouch opened at one end having a three-dimensional portion such as an animal, a unit for solidifying the charged molding material and a unit for extracting the solidified material by expanding the mold under reduced pressure.

Referring to FIG. 9, a pattern for molding 50 for producing the conventional elastic mold is comprised of a three-dimensional main portion 52 and a flat portion 51 connected thereto via a transition zone presenting an acute bend. Thus, when the pattern for molding 50 is immersed in a solution 30 of an elastic material contained in a container 40 for forming a thin membrane around the pattern for molding 50, an elastic mold 20 as shown in FIG. 8 is produced, in which a membrane thickness is increased on the outer side of a take-out opening 13 at a boundary between a product molding section 11 and a mold holding section 12.

When extracting a molded product 60 from the above mentioned conventional elastic mold 20 as shown in FIGS. 10 to 12, the elastic mold 20 having its mold holding section 12 secured to a belt conveyor of a production line (not shown) is transferred to a pressure-reducing chamber 35. First, the pressure-reducing chamber 35 is evacuated as indicated by an arrow in FIG. 10 for increasingly expanding the elastic mold 20 as shown in FIGS. 11 and 12. However, as shown in FIGS. 11 and 12, the take-out opening 13 of the elastic mold 20 cannot be expanded sufficiently because of its increased membrane thickness, so that the molded product cannot be extracted from the mold smoothly. In addition, uniform expansion cannot be achieved because of the difference in membrane thicknesses, thus giving rise to distortions and detracting from durability of the elastic mold.

SUMMARY OF THE INVENTION

It is therefore an object of the present invention to provide an elastic mold exhibiting improved durability to facilitate taking out of a molded product.

It is another object of the present invention to provide a method whereby the molded product can be easily and reliably extracted from an elastic mold which can be easily expanded and which can be extended apart easily at the take-out opening.

For accomplishing the above objects, the present invention provides an elastic mold comprising a product molding section in which a fluidized charging material is charged and solidified to form a molded product, and a mold holding section formed integrally with a take-out opening contiguous to the product molding section and the mold holding section and smaller in size than the molded product, wherein the take-out opening is of uniform thickness and is curved smoothly.

The present invention also provides a method for producing a molded product comprising the steps of charging a fluidized charging material into an elastic mold including a product molding section in which a fluidized charging material is charged and solidified to form the molded product, a mold holding section formed integrally with the product molding section, and a take-out opening contiguous to the product molding section and the mold holding section, the take-out opening being of uniform thickness and curved smoothly, solidifying the charging material charged into the product molding section, and applying pressure to surroundings of the mold for extracting the solidified charging material from the mold.

The present invention also provides a method for producing a molded product comprising the steps of charging a fluidized charging material into an elastic mold including a product molding section in which a fluidized charging material is charged and solidified to form the molded product, a mold holding section formed integrally with the product molding section, and a take-out opening contiguous to the product molding section and the mold holding section, the take-out opening being of uniform thickness and curved smoothly, solidifying the charging material charged in the product molding section, and relieving pressure from surroundings of the mold for expanding the mold for extracting the solidified charging material from the mold.

PREFERRED EMBODIMENTS OF THE INVENTION

Figure 1:
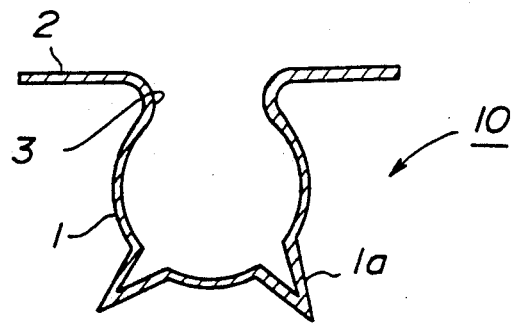
FIG. 1 is a longitudinal sectional view showing an embodiment of an elastic mold according to the present invention.
Figure 8:
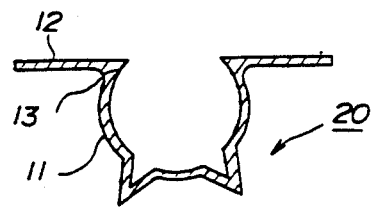
FIG. 8 is a longitudinal sectional view of a conventional elastic mold.
Figure 9:
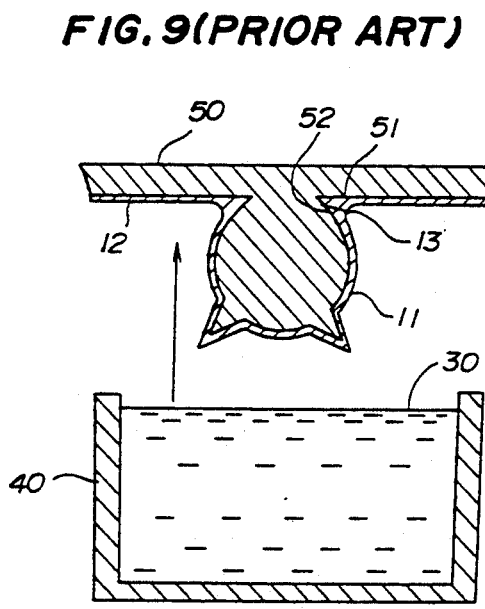
FIG. 9 is a schematic illustrative view showing the state in which a pattern for molding is immersed in an elastic fluidized material for forming a thin membrane thereon for preparing the mold shown in FIG. 8.
Figure 10:
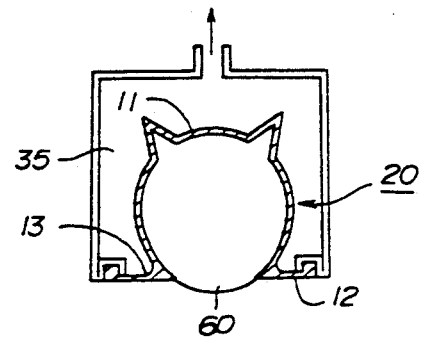
FIG. 10 is a schematic illustrative view showing the state just prior to extraction under reduced pressure using the elastic mold shown in FIG. 8.
Figure 11:
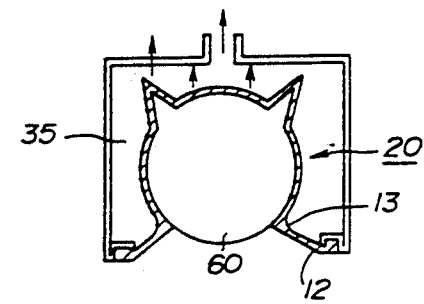
FIG. 11 is a schematic illustrative view showing the state in which pressure is reduced further from the state shown in FIG. 10.
Figure 12:
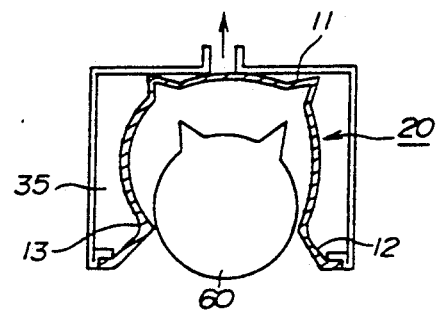
FIG. 12 is a schematic illustrative view showing the state in which the pressure is reduced further from the state of FIG. 11 in readiness for extraction of the product from the mold.

FIG. 1 is a longitudinal cross-sectional view of an elastic mold shaped to produce a molded chocolate product in the form of a cat's head. An elastic mold 10 is composed of a membrane-shaped product molding section 1 for producing the molded chocolate product by charging a fluidized chocolate material therein, a mold holding section 2 for affixture to an automatic continuous chocolate molding apparatus (not shown), a take-out opening 3 at the end of the molding section 1, and a profiled section 1a in the molding section 1 corresponding to a three-dimensional portion of the molded product, herein cat's ears. As will be apparent in comparison with FIG. 8, a bend at the take-out opening 3 of the product molding section 1, that is a region of transition between the product molding section 1 and the mold holding section 2 is of uniform thickness and is curved smoothly.

A method of producing a molded product using the elastic mold shown in FIG. 1 is hereinafter explained.

Figure 2:
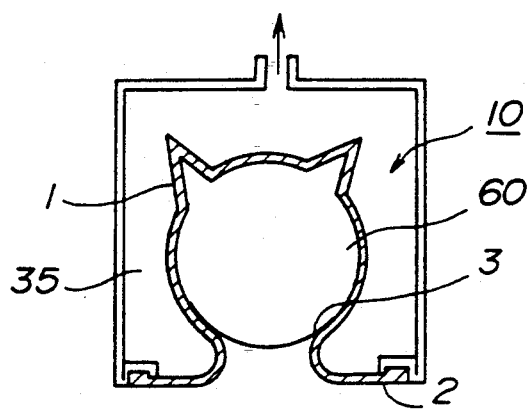
FIG. 2 is a schematic illustrative view showing the state just prior to extraction from the elastic mold under reduced pressure in accordance with a method of preparation according to the present invention.
Figure 3:
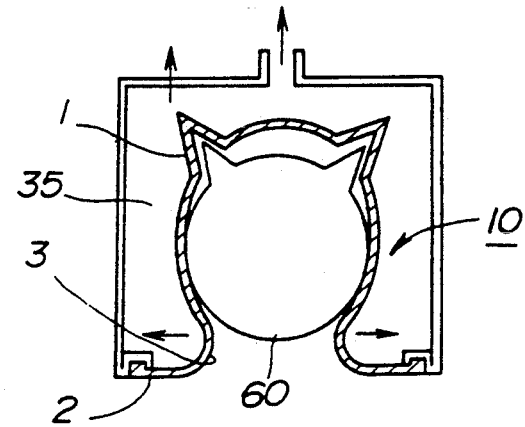
FIG. 3 is a schematic illustrative view showing the state in which the pressure is reduced further from the state shown in FIG. 2.
Figure 4:
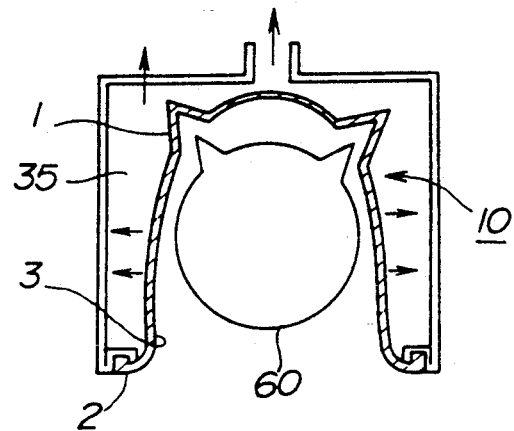
FIG. 4 is a schematic illustrative view showing the state in which the pressure is reduced further from the state of FIG. 2 in readiness for extraction of the product from the mold.

Referring to FIGS. 2 to 4, the elastic mold 10, the mold holding section 2 of which is secured to a belt conveyor of a production line (not shown), is moved into a pressure-reducing chamber 35, which is evacuated by a pressure reducing operation in the direction shown by an arrow in FIG. 3. The pressure reducing operation is continued further for expanding the elastic mold 10 from the state of FIG. 3 to the state of FIG. 4. Since the opening 3 of the elastic mold 10 is of uniform thickness and curved smoothly, the elastic mold 10 in its entirety is expanded uniformly to permit the molded product to be extracted easily from the mold.

Figure 5A:
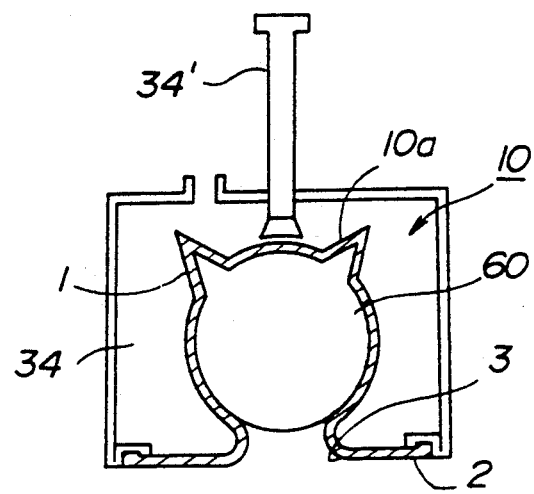
FIGS. 5(a), 5(b) and 5(c) are schematic illustrative views similar to FIGS. 2 to 4, respectively, and showing a method of preparation comparable to the method shown in FIGS. 2 to 4.
Figure 5B:
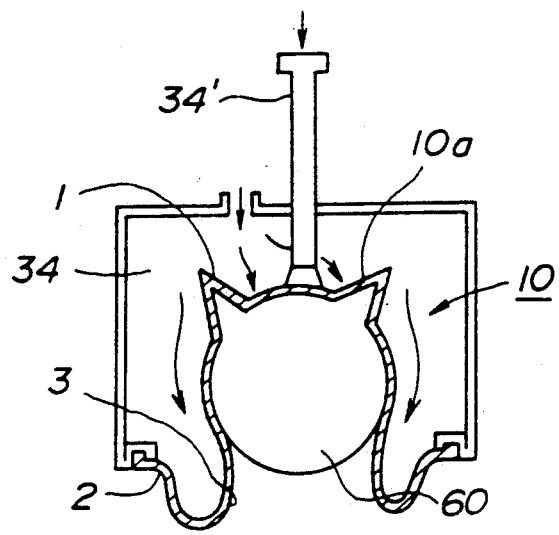
Figure 5C:
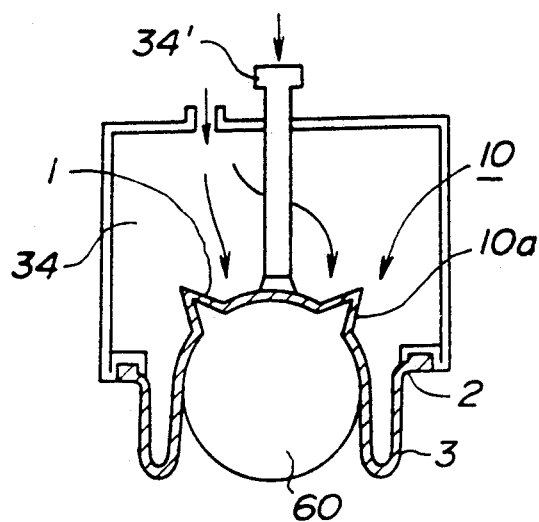

An alternative method, similar to the method shown in FIGS. 2 to 4, will be explained by referring to FIGS. 5(a) to 5(c).

A plurality of the elastic molds 10 according to the present invention are attached at a predetermined interval on an intermittently moved conveyor unit (not shown). A chocolate material in a fluidized state at about 26° to 32° C. is poured via a nozzle (not shown) of a charging unit into the mold 10 through the take-out opening 3. Any air bubble contained in the chocolate material is withdrawn by a vibrator (not shown) provided at the bottom of the conveyor unit. The fluidized chocolate material in the elastic mold 10 is cooled and solidified for about ten minutes by a solidifying unit such as a cooling tunnel (not shown) maintained at about 4° to 7° C. The elastic mold 10 is inverted upside down, and introduced into an extracting unit such as a pressurizing chamber 34 for applying pressure to the outer surface 10a of the mold 10. Then, using a bar-shaped pushing member 34' provided as an auxiliary tool for the pressurizing chamber 34 for pushing the elastic mold 10 and a chocolate molded product 60 therein, the mold is extracted to produce the chocolate molded product 60 (FIGS. 5(a) to 5(c)). Since the take-out opening 3 of the elastic mold 10 is of uniform thickness and curved smoothly, the elastic mold 10 is sequentially peeled off from the vicinity of the take-out opening 3 to permit the molded product to be extracted smoothly from the mold 10. The molded products 60 are then recovered by a belt conveyor (not shown) for transporting the products to a downstream side. Although the chocolate molded product is extracted from the mold 10 with the aid of the pressurizing chamber 34 and the bar-shaped pushing member 34' as an auxiliary tool, the molded chocolate product 60 may be pushed out of the mold 10 only with the aid of the pushing member 34'.

Figure 6:
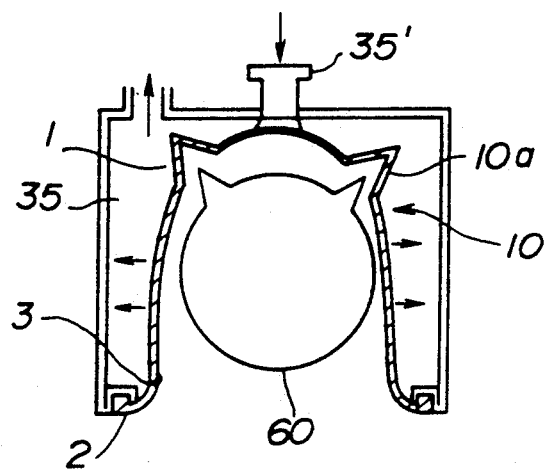
FIG. 6 is a schematic illustrative view showing the state of extraction under reduced pressure from the elastic mold by a modified method according to the present invention.

A still alternative method, similar to the method to FIGS. 2 to 4, will be explained by referring to FIG. 6.

A plurality of the elastic molds 10 according to the present invention are attached at a predetermined interval on an intermittently moved conveyor unit (not shown).

A chocolate material in a fluidized state at about 26° to 32° C. is poured via a nozzle of a charging unit (not shown) into the mold 10 through the take-out opening 3 and any air bubble contained in the chocolate material is withdrawn by a vibrator (not shown) provided at the bottom of the conveyor unit. The fluidized chocolate material in the elastic mold 10 is cooled and solidified for about ten minutes by a solidifying unit such as a cooling tunnel (not shown) maintained at 4° to 7° C. The elastic mold 10 is inverted upside down and introduced into an extracting unit such as a pressure-reducing chamber 35 for expanding the outer surface 10(a) of the mold 10. Then, using a bar-shaped thrusting member 35' provided as an auxiliary tool for the pressure-reducing chamber 35, the mold is extracted to produce a chocolate molded product 60 (FIG. 6). The molded product 60 is then recovered using a conveyor device (not shown) for transportation to a downstream side.

Meanwhile, when charging the fluidized chocolate material into the elastic mold, it is desirable to expand and stretch the mold such as by pressure reduction to level out unevennesses before charging a predetermined amount of the chocolate material, to subsequently restore the elastic mold to its original shape, so that air bubbles are withdrawn, causing to prevent voids from being formed on the surface of the molded product.

Figure 7:
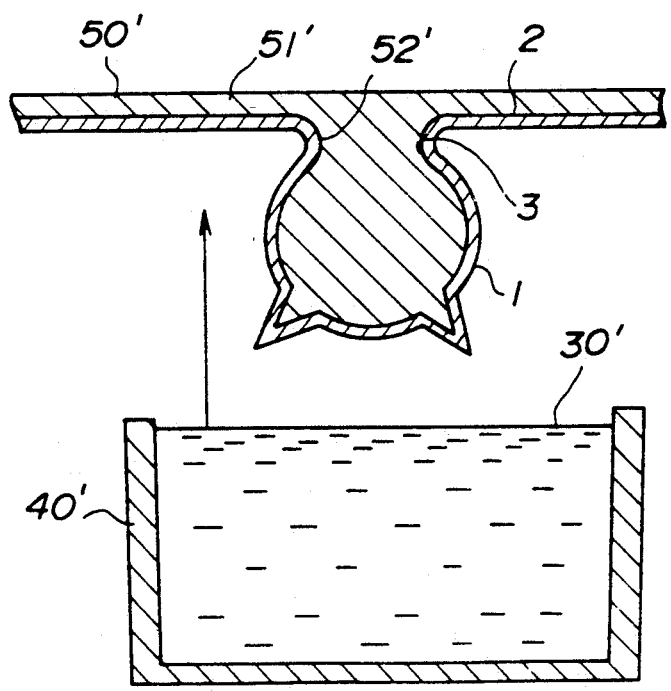
FIG. 7 is a schematic illustrative view showing the state in which a pattern for molding is immersed in an elastic fluidized material for forming a thin membrane thereon for preparing an elastic mold according to the present invention.

Referring to FIG. 7, a method for producing the elastic mold 10 according to the present invention will be explained.

First, a pattern for molding 50' comprised of a three-dimensional main portion 52' having the same shape as the product molding section 1 conforming to the shape of a desired chocolate molded product, and a flat portion 51' contiguous to the three-dimensional main portion 52' at a rounded corner devoid of any acute transition zone, is produced from glass, ceramics or heat-resistant resin. It is preferred that, depending on the size of the product molding section 1, the flat portion 51' of the pattern 50' be provided integrally with a plurality of three-dimensional portions 52' for improving mass-producibility of the chocolate molded products by an automatic production apparatus. The pattern for molding 50' is immersed in a container 40' containing a solution of an elastic material 30' such as a latex solution until the plane of the flat portion 51' is dipped in. A plurality of the three-dimensional portions 52' may be provided on each surface of the flat portion 51' of the pattern 50'. In this case, the pattern 50' is immersed in its entirety in the solution of the elastic material 30' and repeatedly dried and cured a number of times for further increasing the membrane thickness for improving durability. The pattern 50' may also be rotated slowly during immersion for producing the membrane with uniform thickness.

The thin membrane affixed to the outer surface of the pattern 50' is dried, cured and peeled off from the pattern 50' to complete the elastic mold 10, as shown in FIG. 7.

With the above described elastic mold of the present invention, the take-out opening of the elastic mold contiguous to the product molding section and to the mold holding section, is of uniform thickness and is bent smoothly, so that the extraction of the molded product at the take-out opening is facilitated while durability of the elastic mold is also improved.

Besides, with the method for producing the molded product according to the present invention, if pressure is exerted on the outer side of the elastic mold for extracting the solidified charging material, that is the molded product, the inner surface of the elastic mold is peeled off from the take-out opening, because the take-out opening is of uniform thickness and curved smoothly. Thus, the molded product may be extracted from the mold easily and smoothly.

On the other hand, with modified method for producing the molded product according to the present invention, if the pressure exerted on the outer side of the elastic mold is decreased to expand the mold to extract the solidified charging material from the mold, the mold may be expanded uniformly, since the take-out opening of the mold is curved gradually, so that the take-out opening is extended apart sufficiently to permit smooth extraction of the molded product from the mold.

Meanwhile, a fluidized charging material of the present embodiment includes a material which is initially liquid and subsequently solidified by cooling or heating, so that the material encompasses foodstuffs such as chocolate cake, ice cake, or jelly cake, or articles for daily use, such as soap, wax or plaster. The elastic mold includes a mold formed of rubber or resin and encompasses a range of materials that are made from a fluidized material such as liquid to form an elastic material in the form of a solidified membrane. The mold holding section is not only in the form of a flat plate with respect to the product molding section but may also be in the form of a funnel, a tube or in a composite form of the funnel and the tube.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. In an elastic mold comprising a three-dimensional product molding section in which a fluidized charging material is charged and solidified to form a molded product, a mold holding section for allowing said elastic mold to be fixed to holding means, and an intermediate curved portion interposed between said product molding section and the mold holding section, said intermediate curved portion having a take-out opening smaller in size than said molded product, said intermediate curved portion not constituting a molding surface for molding said molded product, the improvement wherein said intermediate curved portion is of uniform thickness and is curved smoothly whereby said molded product is extracted from the mold by inverting gradually an inside of said mold to outside.

2. In an elastic mold comprising a three-dimensional product molding section in which a fluidized charging material is charged and solidified to form a molded product, a mold holding section for allowing said elastic mold to be fixed to holding means, and an intermediate curved portion interposed between said product molding section and the mold holding section, said intermediate curved portion having a take-out opening smaller in size than said molded product, said intermediate curved portion not constituting a molding surface for molding said molded product, the improvement wherein said intermediate curved portion is of uniform thickness and is curved smoothly whereby said molded product is extracted from the mold by expanding the mold.

* * * * *